March 8, 1927.

H. V. REED

CLUTCH

Filed Aug. 14, 1925

Inventor:
Harold V. Reed
By Wm O Belt Atty.

March 8, 1927.  1,619,884
H. V. REED
CLUTCH
Filed Aug. 14, 1925  2 Sheets-Sheet 2
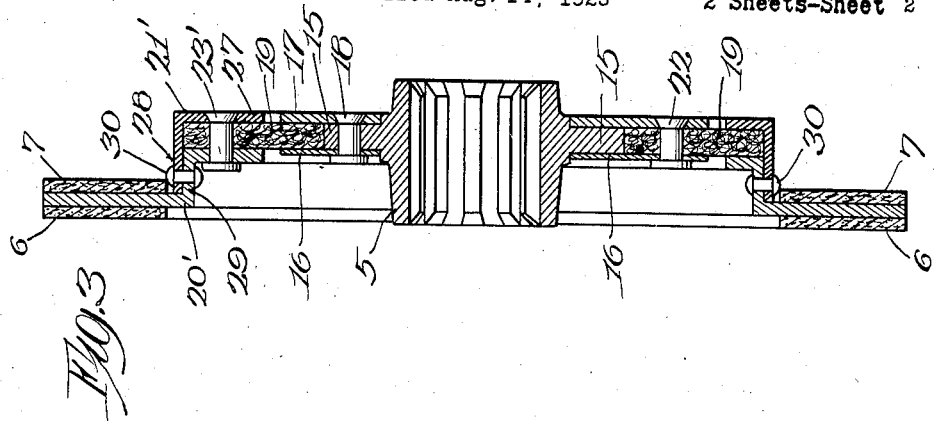
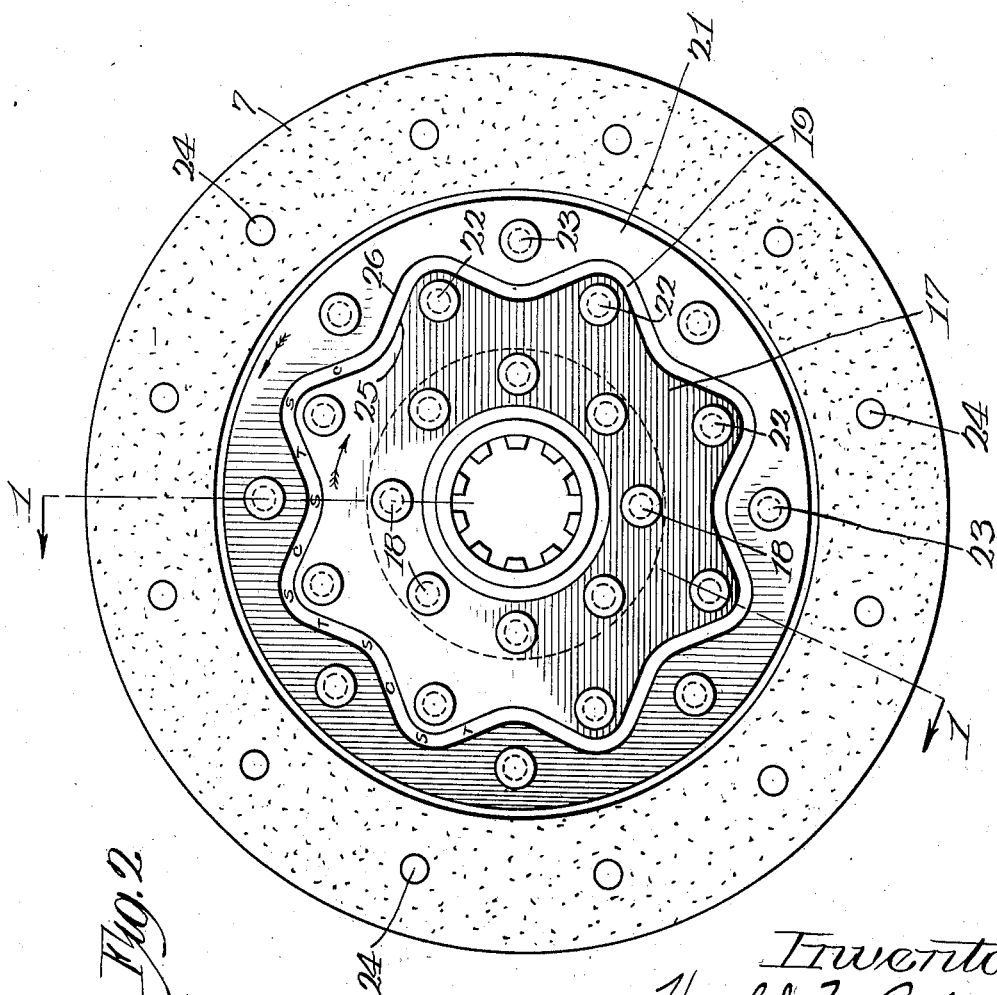
Inventor
Harold V. Reed
By Wm. O. Bell Atty.

Patented Mar. 8, 1927.

1,619,884

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

CLUTCH.

Application filed August 14, 1925. Serial No. 50,167.

In a certain well known type of clutch particularly used with automobiles, the driving shaft is provided with a fly-wheel having a surface which is employed as one of the friction surfaces of a friction clutch. A driven shaft is mounted coaxially with the driving shaft and has splined thereon a frictional element having a pair of friction plates adjacent its periphery one of which plates lies between the friction element and the aforesaid surface of the fly-wheel and the other of which is engaged by a cam ring. Suitable means is provided to operate upon the cam ring to cause movement of the friction element towards and from the fly-wheel to throw the clutch into or out of engagement.

In the past the friction element referred to has generally been formed of a metal plate. More recently it has been proposed to cut this plate thereby forming two concentrically mounted spaced apart sections which are connected by a comparatively stiff member of fibrous material. The member of fibrous material forms a relatively flexible connection between the inner and outer sections of the friction element and acts as a cushioning means. It is to this latter type of friction element that my invention relates.

In this type of friction element it has been customary, as noted above, to make the two sections concentric. The shear placed upon the fibre connecting member has been very great and is applied along one line. My invention resides primarily in making the adjacent edges of the sections of the friction element in an irregular form preferably scalloped. That is, certain portions of the edge of each section are further away from the center of the driven shaft than are others on either side thereof. By this means the shear is distributed over a much greater section and, in fact, the shear is very largely replaced by a combination of tensile and compressive stresses which the material is better able to stand. Also the rivets which are used to fasten the parts together are more advantageously placed as will be brought out more fully during the progress of the description.

In the accompanying drawings in which I have shown selected embodiments of my invention, Fig. 1 is a longitudinal section through a clutch and showing one form of my invention applied thereto, a section of the friction element being taken on the line 1—1 of Fig. 2.

Fig. 2 is an elevation of the friction element shown in Fig. 1.

Fig. 3 is a section of a friction element corresponding to the section shown in Fig. 1, but showing a modified form of my invention.

Figure 1:
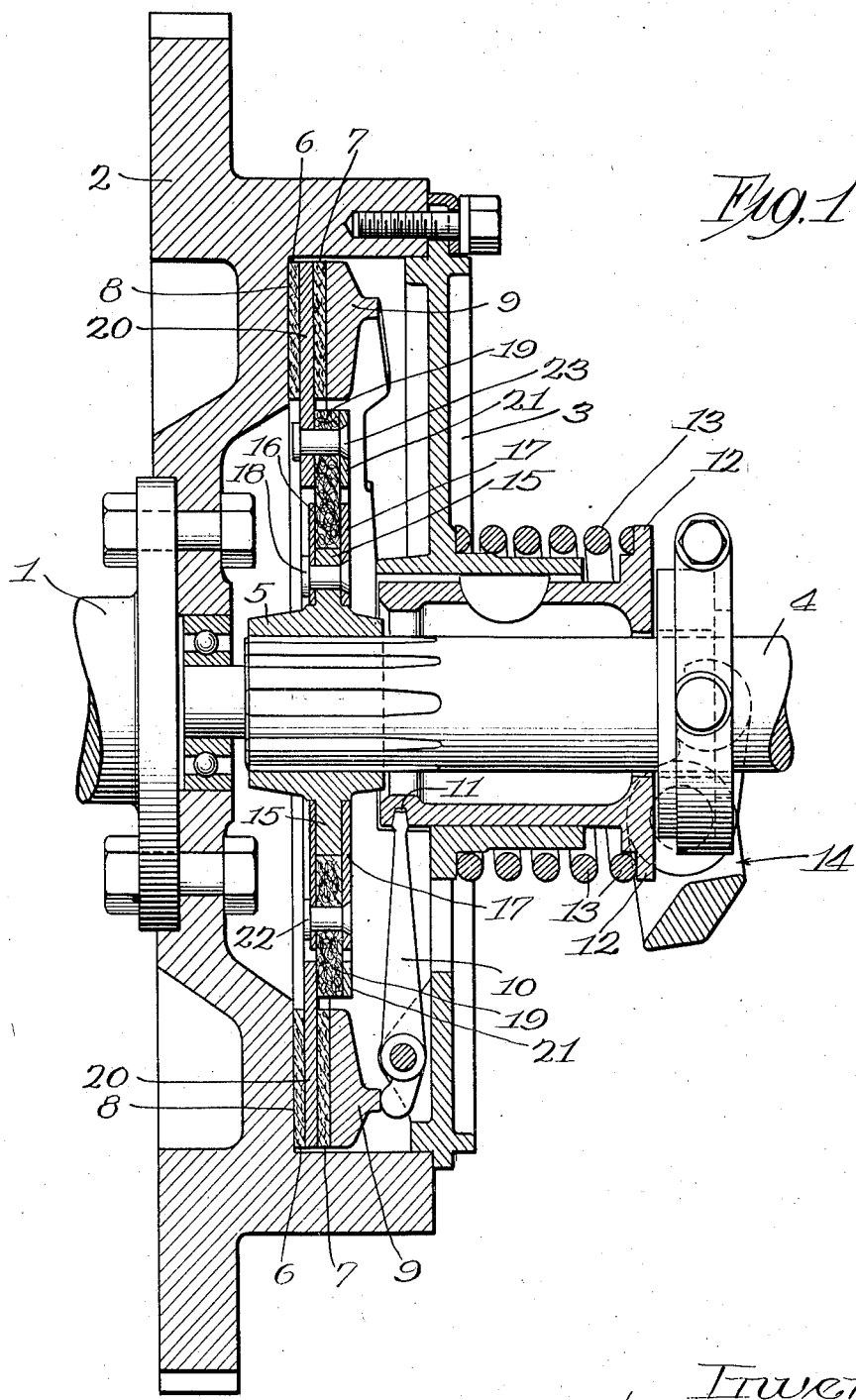

Referring now to the drawings the numeral 1 designates a driving shaft having secured thereto a fly-wheel 2 carrying a cover plate 3. Journaled in the fly-wheel is one end of a driven shaft 4, which passes through an aperture in the cover plate 3. Splined upon the driven shaft 4 is the hub 5 of a friction element embodying my invention and which will be described more fully in detail later on.

This friction element also includes friction rings 6 and 7, the ring 6 engaging the surface 8 of the fly-wheel and the ring 7 being in turn engaged by the cam ring 9. Pivotally mounted on the inner face of the cover plate 3 are a plurality of operating levers 10 having one end of each lever engaging the cam ring and the other received within a recess 11 in a slidable collar 12 mounted upon the shaft 4. This collar is normally urged to the right in Fig. 1 by means of a coil spring 13 whereby the clutch will be thrown in. The clutch may be thrown out by moving the collar to the left, as viewed in Fig. 1, by any suitable clutch release mechanism indicated generally at 14.

The hub 5 is provided with the peripheral flange 15 to which are riveted one section 16 of the friction element and a ring 17 disposed upon the opposite side of the flange 15. These two members are secured to the flange 15 by a plurality of rivets 18 and extend a substantial distance beyond the edge of the flange, as plainly shown in Fig. 1. Received between the section 16 and ring 17 and secured thereto by rivets 22 is a flexible cushioning member 19 and secured thereto is the outer section 20 of the friction element and the ring 21, these two members being disposed upon the opposite sides of the cushioning member and secured thereto by a plurality of rivets 23. The friction rings 6 and 7 are secured to the section 20 in the usual manner as by rivets 24.

The rings 17 and 21 form respectively inner and outer rivet rings by means of which the cushioning member may be rigidly secured to the sections of the friction element. These rings prevent the wearing of the rivets by which the cushioning member is secured to the sections of the friction element.

Referring particularly to Fig. 2, it will be seen that the outer edge 25 of the section 16 or ring 17 is scalloped, certain points being further away from the center of the shaft than others. The inner edge 26 of the section 20 or ring 21 is parallel to the outer edge 25. The rivets 22 are placed in the outermost points formed by the scalloped edges 25, thereby receiving less stress than if placed nearer the center.

Assuming that the structure shown in Fig. 2 is revolving counterclockwise, the force causing this movement is applied to the friction rings 6 and 7, that is, to the outer section 20 of the friction element. Then it will be seen that the portion of the cushioning member 19, disposed on the left of each rivet 22 is placed in tension, as indicated by the letter T. The portion of this member on the right of each rivet 22 is placed in compression, as indicated by the letter C. The only parts which will be in shear are those at the top and bottom of the scallops, as indicated by the letter S. This is a decided improvement over the structure previously employed wherein the edges 25 and 26 are concentric and where a cushioning member is in shear substantially throughout the portion disposed between these two edges 25 and 26.

In Fig. 3 I have shown a modification of my invention. The flange 15 has secured thereto the inner section 16 and the inner rivet ring 17 by means of the rivets 18 in the same manner as previously described in connection with the modification of Figs. 1 and 2. Likewise the cushioning member 19 is secured between section 16 and the rivet ring 17 by means of rivets 22. Under certain conditions it is desirable to use an offset friction element of the general form shown in Fig. 3 in order to bring the friction rings 6 and 7 nearer to the fly-wheel. When my invention is to be employed under these conditions I secure the outer section 20' of the friction element to the cushioning member 19 by the rivets 23' in the same manner as before. The outer rivet ring 21', however, I make in the form of an angle having a leg 27 to receive the rivets 23' and a second leg 28 extending over the edge of the cushioning member and fastened to the offset portion 29 of the section 20', as by rivets 30. It will be seen that this construction prevents relative movement between the outer rivet ring and the outer section of the friction element and thus insures a stronger connection between the outer section and the cushioning member. The rivets 23' are placed in double shear instead of single shear with all the well known advantages of double shear over single shear. The same condition is approximated in the form shown in Figs. 1 and 2, but it is actually realized in the form shown in Fig. 3.

From the above it will be apparent that I have provided a clutch having a cushioning member joining the inner and outer sections of the friction element and in which the stresses are distributed to the best advantage throughout the structure.

Not only is the shear in the cushioning member very largely replaced by tensile and compressive stresses, but the rivets are so placed as to reduce the stress thereon to a minimum.

I am aware that changes in the form, construction and arrangement of parts may be made without departing from the spirit and without sacrificing the advantages of the invention and I reserve the right to make all such changes as fairly fall within the scope of the following claims.

I claim:

1. In a clutch, a friction element comprising a hub adapted to be splined upon a shaft and having a peripheral flange, an inner section secured to said flange on one side thereof, an inner rivet ring secured to the other side thereof, rivets passing through said inner section, said flange and said rivet ring, a flexible cushioning member disposed between said inner section and said rivet ring beyond the edge of said flange, rivets passing through said inner section, said flexible member and said inner rivet ring, and an outer section secured to said flexible member.

2. In a clutch, a friction element comprising a hub adapted to be splined upon a shaft and having a peripheral flange, an inner section secured to said flange on one side thereof, an inner rivet ring secured to the other side thereof, rivets passing through said inner section, said flange and said rivet ring, a flexible cushioning member disposed between said inner section and said rivet ring beyond the edge of said flange, rivets passing through said inner section, said flexible member and said inner rivet ring, and an outer section secured to said flexible member, portions of the edges of said inner section and said inner rivet ring being spaced further from the center of said shaft than other portions thereof and said last named rivets being disposed in the portions of said section and ring furthest removed from said center.

3. In a clutch, a friction element comprising a hub adapted to be splined upon a shaft and having a peripheral flange, an inner section secured to said flange on one side thereof, an inner rivet ring secured to the other side thereof, rivets passing through said inner section, said flange and said rivet ring, a flexible cushioning member disposed between said inner section and said rivet ring beyond the edge of said flange, rivets passing through said inner section, said flexible member and said inner rivet ring, an outer section secured to said flexible member, an outer rivet ring disposed on the side of said flexible member opposite said outer section and rivets passing through said outer section, said flexible member and said outer rivet ring.

4. In a clutch, a friction element comprising a hub adapted to be splined upon a shaft and having a peripheral flange, an inner section secured to said flange on one side thereof, an inner rivet ring secured to the other side thereof, rivets passing through said inner section, said flange and said rivet ring, a flexible cushioning member disposed between said inner section and said rivet ring beyond the edge of said flange, rivets passing through said inner section, said flexible member and said inner rivet ring, an outer section secured to said flexible member, an outer rivet ring disposed on the side of said flexible member opposite said outer section and rivets passing through said outer section, said flexible member and said outer rivet ring, portions of the edges of said inner section and said inner rivet ring being spaced further from the center of said shaft than other portions thereof and said last named rivets being disposed in the portions of said outer section and outer ring nearest said center.

HAROLD V. REED.